Figure 10:
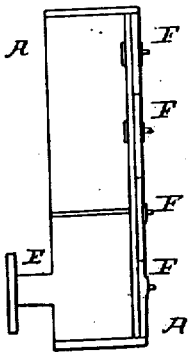

No Printed Specification Available

7915½X

S. H. Long,

Steam Slide Valve.

Patented Dec. 30, 1833.

N. PETERS, PHOTO-LITHOGRAPHER, WASHINGTON, D. C.

[illegible]
Dec. 30. 1833 315

Stephen H Long. U. S. Army 7915½ X

Letters Patent

The schedule referred to in these Letters patent and making
part of the same containing a description in the words of the said
Stephen H Long himself of his improvement in the construction
of the main Steam valves of Locomotive and other Steam engines; the
Force Pumps of such engines and the wheels for Locomotive engines To all to whom these presents shall come
Be it known that I Stephen H Long of the United States
Army have invented and applied certain new and useful improve-
ments in the construction of the main Steam valves of the Pow-
erful Locomotive and other Steam engines. Also in the con-
struction of the force pumps of such engines. And also in the man-
ner of constructing the wheels of Locomotive Engines and of other
Rail way Carriages and that the following is a full and exact
description of my said improvements viz.
First of the main Steam valve:
My improvement in the Steam valve consists in the adoption
of two slide valves one above the other: which I designate the upper
and lower slide valves and which in conjunction I denominate
the double slide valve. The object of the upper valve is to inter-
cept or cut off the passage of the steam into the cylinder at about
half of every stroke of the piston while that of the lower
valve is as usual to regulate the admission of steam alter-
nately into each end of the Cylinder
The lower valve differs from the ordinary slide valve in having
its [illegible] extended at both ends in the direction of
its [illegible] to give place to two orifices each
[illegible] of the [illegible] of the
Steam [illegible]

26 7915½X into two or more orifices in its [illegible] through the upper surface
of the lower valve. The orifices last mentioned are of equal area
but transversely of the valve with those of the valve seat and have
an aggregate area equal to that of either orifice situate in the lower
side of the valve or in the valve seat itself. When there are two
orifices on either side of the centre of the valve and in its upper sur
face the area of each should be equal to one half that of the low
er orifice and when there are three orifices in the upper sur-
face. the area of each should be equal to one third that of the
lower orifice. and in a similar proportion for a greater num
ber of orifices. All the orifices leading through the lower valve serve
to convey the steam from the steam chest to the side pipes of the
cylinder. The lower valve also differs from the common slide
valve in the manner of its attachment to the valve rod which
is effected by means of a single nut which serves not only to
confine the valve to the rod but to adjust the valve in its proper po
sition. It moreover differs from the common valve in being
furnished with guides to regulate the movements of the upper valve
The upper valve is furnished with one or more perforations on each
side of its centre corresponding to the orifices in the upper sides of the
lower valve and respectively of equal area. the number being less by
one than that of the lower valve on each side of its centre. The coinci
dence between the orifices of the upper and lower valves is such however
that when the orifices of the lower valve are uncovered by the upper valve
on one side of their centres. the orifices on the other side are covered
by the upper valve and vice versa.
The alternate opening and closing of the orifices of the lower valve
is effected by intercepting the movements of the upper valve and com-
pelling the lower valve to slide under it while the upper valve remains
at rest. The valve [illegible] through which the two valves [illegible]
[illegible]
[illegible]
[illegible]

the distance traversed by the lower valve and when there are three
orifices the motion of the upper valve should be five sixths that
of the lower and in due proportion for any other number of orifices
The manner of adjusting the upper and lower valves and of inter
cepting the passage of the steam into the cylinders at about half
the stroke of the piston will be more clearly understood by an in
spection of the drawings hereto annexed.

Second. Of the force Pump.

My method of constructing and adjusting the valves of the Force
Pump for Locomotive and other Steam Engines consists in the
introduction of two or more valves through which the water is
forced from the pump to the Boiler. and two other similar valves
through which the water is drawn into the Pump. All of which
Valves are arranged one above another and at suitable intervals asunder
in one and the same valve-box or chamber which may be either
of a cylindrical form or of the form of a Parallelopipedon. the latter
being deemed most convenient The two draft valves occupy the lower while the force valves
occupy the upper portion of the valve chamber. The barrel of the force
Pump in which the plunger or piston operates and which may be
of any convenient form communicates with the valve chamber at
a point and through an orifice situated between the draft and
the force valves.

The portion of the valve chamber which is situated between the
two draft valves has an orifice in one of its sides communica
ting with a hand pump to be worked occasionally by manual
labour for the purpose of supplying the boilers when the engine
to which it is attached is not in operation The water is drawn into the valve chamber and thence into the force
Pump through an orifice in the lower extremity of the chamber and
ejected from the same through a similar orifice in the upper extremi
ty of the chamber. Each apartment of the valve chamber is
furnished with a [illegible] or [illegible] by which it is effectually closed

7915½ X in a manner to prevent all leakage — The entire front of the
valve chamber except a small moulding at the top and bot
tom is covered by three lids either or all of which may be removed
and replaced at pleasure by means of the screw bolts which
confine them to the chamber — The form of the chamber may
be cylindrical or square as may be found most convenient
the square form is however deemed preferable inasmuch as it
affords greater facilities for the insertion of the valves and for the
adjustment of the lids or bonnets Third of the Wheels In addition to former improvements in the construction of the
Wheels of the Pennsylvania Locomotive. I claim as a new
and useful improvement in the construction of Locomotive Engines
the application of circular iron hubs cast in a single piece each
for the reception of wooden spokes. said Hubs being constructed
after the manner heretofore adopted by M. Imlay of Philadel
phia in the construction of burthen and passenger cars I also claim as a new and useful improvement in the
construction of Car Wheels and especially of the wheels of Locomo
tive Engines the adoption and use of double felloes of wood in
connection with cast iron hubs and wooden spokes The wheel rim is composed of two distinct series of half fel
loes applied to the spokes by means of notches in each series em
bracing the tenons of the spokes instead of mortises. The felloes are
arranged in such a manner that the half felloes of one series
break joints with those of the other series. By this means the
necessity of dowelling the felloes together is obviated although
dowels either square or round may be employed if desirable
The double felloes are firmly Bonded together by rivets passing thro
them near to and on both sides of every spoke. In applying the
iron tire to the wheel rim thus constructed care should be taken
to avoid driving the [illegible] nails [illegible] into the [illegible] of the
felloes. In order to connect the felloes more firmly together and to impart additional strength and solidity to the wheel I employ iron clamps situated between the felleys and the tire at those points where the ends of the felleys are united and where of course the wheel rim is weakest. These clamps are applied transversely of the wheel rim and extend quite across the felleys. — Each clamp is composed of a bar of iron about half an inch thick and about one and a half inches wide and is furnished with a half head or joggle at each end of a depth equal to that of the bar and formed by bending the ends of the bar at right angles with itself. — The heads of the clamps are adapted to recesses in the felleys prepared for their reception while the intermediate parts of the clamps lie imbedded in the felleys and in immediate contact with the tire. The nails or bolts by which the tire is fastened upon the rim pass through the clamps which are furnished with holes for their reception The annexed drawings and their explanations will exhibit more clearly the ~~[illegible]~~ nature of the principal improvements above described and the manner of their application Explanation of the Drawings Fig I. A vertical section of the double valve and its seat, together with a portion of the Steam Chest.

A a part of the Steam Chest — B the valve seat a. portions of the side pipes communicating with the steam Cylinder — b. the steam pipe for exhausting the Cylinder or the exhaust pipe — C. the lower slide slide valve c. The steam ways leading through the valve each way communicating with a single orifice in the lower surface of the valve and with three orifices in its upper surface D. The upper slide valve communicating with the lower valve by means of the orifices d. d. The movements of the upper valve are effected by sliding on the upper surface of the lower valve and [illegible] [illegible] the steam ways through the latter alternately [illegible] [illegible] [illegible] of the valve

7915½ X

Figure 7:
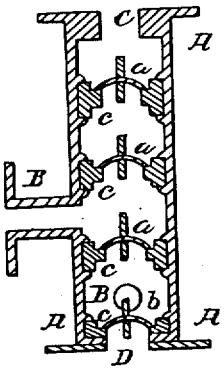
Figure 9:
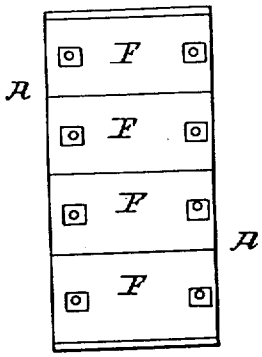
Figure 6:
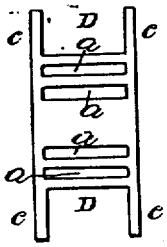
Figure 8:
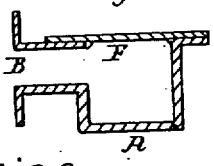
Figure 5:
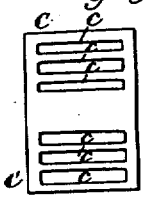
Figure 2:
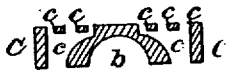
Figure 3:
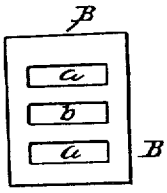
Figure 1:
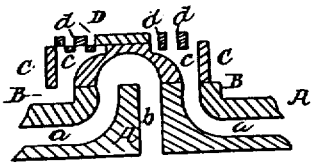
Figure 4:
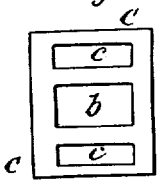

Fig 2. A vertical section of the lower slide valve same as C.c.2 of Fig 1.
Fig 3. A horizontal view of the steam valve seat same as B. a. 2. of Fig 1.
Fig 4. a horizontal view of the lower surface of the lower slide valve.
Fig 5. a horizontal view of the upper surface of lower steam valve. C.c. b of Fig 4 & 5 same as in Fig 1 & 2.
Fig 6. a horizontal view of the upper steam valve same as D. d. of Fig 1. c. Arms projecting from the valve and impinging against the side of the valve chest in order to intercept the movements of the valve for the purpose of allowing the lower valve to slide beneath it far enough to close the orifices alternately on each side of the valve centre.
Fig 7 a vertical section of the valve chamber of the force pump exhibiting the relative positions and arrangement of the valves A. the valve [illegible] B a branch pipe or orifice communicating with the barrel of the force pump which has no other connection with the valve chamber. C the orifice through which the water is forced into the boiler. D. the orifice through which the water is drawn into the valve chamber and pump. E. the orifice communicating with the barrel of the hand pump. a the force valve b the draft valve. c the valve seats.
Fig 8. a horizontal section of the valve chamber through the tube communicating with the force pump.
A and B same as in Fig 7.
F. a cap or Bonnet covering one of the apartments of the valve chamber — Fig 9. a front view of the valve chamber exhibiting the bonnets F by which the apartments of the chamber are closed — Fig 10. a side view of the valve chamber exhibiting the tube communicating with the hand pumps A. E & F same as in Fig's 7 & 8.
The improvements described in the foregoing specifications and claimed as new useful and original are briefly as
follows. Viz – 1st The construction and application of the doub
le slide valve and its steam ways not only the main steam
valve of Locomotive Engines but of other Steam Engines in which
it is desirable to intercept the passage of the steam into the
working Cylinder at half or less than half the stroke of the
piston! – Second – The adaption and construction of
a single valve chamber for the force pump of a Locomotive or other
Steam Engine in which chamber all the valves of the force pump are
situated one above another. the number of the valves being suscep
tible of any increase that may be deemed desirable so that there
may be one or more draft or suction valves and one or more force
or ejection valves – I moreover claim as new and useful the
mode of connecting the valve chamber with the force pump by means
of which the water is first drawn into the force pump. through
the lower part of the valve chamber and then forced onward tow
ards the boiler through the upper part of the same valve chamber
I also claim as new and useful the method of attaching a hand
pump to the main valve chamber which is effected by a communi
cation with the latter at any point situated between any two
of the valves – Third. the employment of double felloes in the
construction of wooden Wheels for Rail Road carriages of all descrip
tions and the application of circular hubs of cast iron each hub
being formed of a single casting. to Locomotive Steam Engines
These several improvements I claim new especially in their
application to Locomotives or other Steam Carriages intended
for Rail Roads In testimony that the above is a true Specification of
my said improvements as above described I have hereunto set my
hand this twenty sixth day of August AD 1833.

Witnesses
Charles P. Heath
Wm A. Patrick

S. H. Long

[illegible]

2652 [illegible]

Dr [illegible]